March 17, 1970  D. JAWOREK  3,501,009

THIN LAYER CHROMATOGRAPHY APPARATUS

Filed April 14, 1969

INVENTOR:
DIETER JAWOREK

By: Burgess, Dinklage & Sprung

United States Patent Office 3,501,009
Patented Mar. 17, 1970

3,501,009
THIN LAYER CHROMATOGRAPHY APPARATUS
Dieter Jaworek, Tutzing, Upper Bavaria, Germany, assignor to Boehringer Mannheim G.m.b.H., Mannheim-Waldhof, Germany
Filed Apr. 14, 1969, Ser. No. 815,563
Claims priority, application Germany, Nov. 21, 1968, 1,810,216
Int. Cl. B01d 15/08
U.S. Cl. 210—198                                    13 Claims

ABSTRACT OF THE DISCLOSURE

A thin layer chromatography apparatus adapted for carrying out thin layer gel and ion exchanger chromatography is provided comprising a sandwich chamber consisting of a gel plate, a cover plate and a pair of longitudinally slit tubes drawn over the lateral edges of either the gel or cover plate; a chamber holder provided with pivot means at one end thereof for pivotably holding the sandwich chamber at one end thereof and a washing agent trough mounted on the other end of the chamber, said trough being mounted for rotational movement about an axis located above its center of gravity.

---

The present invention relates to an apparatus for carrying out thin-layer chromatography, and more particularly to an apparatus especially designed for thin-layer gel chromatography and ion exchanger chromatography.

Thin-layer chromatography has acquired considerable importance in recent years, as it is an easy procedure to carry out, takes little time, and consumes very little material. Recently, there has been considerable interest in the possibility of using absorbent molecular filter materials and ion exchangers in connection with thin-layer chromatography, since this would substantially increase the versatility and applications of thin-layer chromatography.

However, thin-layer chromatography using molecular filters and/or ion exchangers in the gel form presents considerable difficulties. In contrast to the thin-layer chromatography materials that are conventionally used, gels do not have any capillary activity which would enable them to absorb the washing agents involved in these procedures. For this reason, the conventional techniques cannot be used with gel form materials and instead the chromatography has to be carried out with the apparatus maintained in an inclined position, i.e., at angles of inclination of between about 15 and 30°, so that the washing agent passes through the gel layer in a downward direction. The connecting linkage or through passage between the washing agent reservoir and the gel layer material usually takes the form of an absorbent material, such as, for example, a strip of filter paper. The removal of liquid from the bottom portion of the gel layer is made possible in a similar manner, i.e., by providing a strip of absorbent material connecting the bottom most portion of the gel layer to a collecting trough. Finally in order to prevent the gel layer from drying out during the chromatography, the entire separation procedure has to be carried out in a sealed chamber.

The apparatus which have been available hitherto are equipped with chambers of the type just described and are associated with the disadvantage that for carrying out thin-layer chromatography, they have too large an interior volume, so that a part of the solvent evaporates on the plate in the chamber, thereby producing variations of concentration and components in the gel layer. Consequently, it is not possible to realize reproducible results with the known apparatus. If the outside air is permitted access to the system, even if only very briefly, as for example at the start of the test, or in connection with the carrying out of quick checks with an ultraviolet lamp or with a Geiger counter, the restoration of the equilibrium of the internal atmosphere takes some time. As this must be prevented, in the prior-art apparatus involving the use of a separating chamber system, the separation process cannot be monitored, even though it is extremely important to do so particularly in the cases where colorless substances are being separated, such as proteins and nucleotides. As a result, apparatus requiring separator chambers, have not been widely used in thin-layer gel chromatography.

Another apparatus is known for use in absorbent gel thin-layer chromatography and involves the use of the so called "sandwich chamber" having been described by H. Determann and W. Michel in Z. analyt. Chem. 212, 1965, 211. In this apparatus the plate bearing the gel coating is provided with a pasteboard strip on each of the opposite sides thereof, which serve to hold a second plate close to but yet not touching the gel coating. The plates are held together by clips which simultaneously serve for providing the sandwich chamber with an invariable angle amounting to 12 to 15° from the horizontal. This apparatus is also associated with considerable disadvantages. For example, the pasteboard strips used as the edges do not provide a good seal, so that the chamber system is far from ideal, and also they absorb some of the washing agent (the washing agent that runs downwardly on the plate, or is created in the system by condensation) resulting in the creation of edge effects. The components which run along the edges of the plate therefore do not migrate along a uniform front. Furthermore, the clips holding the sandwich chamber plates together must be very tight in order to provide the degree of tightness of seal around the system required for reproducible results. As a consequence when the plates are clipped together, the cardboard strips easily shift and the gel coating is damaged, as are also the edges of the plates. Furthermore, the cover plate cannot be removed easily and quickly enough for rapid tests to be carried out with an ultraviolet lamp, Geiger counter, or the like. Lastly, the chromatography angle cannot be adjusted with the required degree of simplicity, as the washing agent trough and the chamber have to be shifted separately, and this is difficult while the chromatography procedure is in the process of being carried out. Therefore, even with this improved apparatus, the popularity of thin gel layer chromatography has not been increased.

The result of the lack of a really suitable apparatus for carrying out thin gel layer chromatography is that this valuable analytical procedure has hitherto been considered by technical personnel to be impractical, as sufficiently reproducible results cannot be achieved thereby.

It is one of the principal objects of the present invention to provide means for carrying out thin-layer chromatography and ion exchanger chromatography avoiding the disadvantages of the known apparatus.

It is another object of the present invention to provide means for carrying out thin-layer gel chromatography and ion exchanger chromatography in a simple and an economically feasible manner and which provides reproducible results.

With these and other objects and advantages in view, the invention embodies a thin-layer chromatography apparatus comprising a sandwich chamber consisting of a gel plate and a cover plate, a pair of longitudinally slit tubes drawn over the lateral edges of one of the two plates, a chamber holder provided with a hinged portion at one end thereof for pivotably holding the sandwich chamber at one end thereof and a washing agent trough mounted on the other end of the chamber, the said trough being mounted for rotational movement about an axis located above its center of gravity.

The sandwich chamber constructed according to the invention combines in a most simple manner all of the characteristics which are desirable in connection with a sandwich chamber. The clearance between the plates can be changed quite simply and merely by using slit tubes of different wall thicknesses. The cover plate serves to seal the chamber so tightly that no moisture can evaporate from it, thereby assuring an absolutely uniform migration of the washing agent. This is accomplished without requiring the use of holding clips, so that rapid checks can be conducted with the desired speed and simplicity. In addition, the chromatography angle can be varied simply and quickly even while the chromatography procedure is in progress, due to the hinged chamber holder arrangement and the pendent washing liquid trough taught in accordance with the invention.

In a preferred embodiment, the thin-layer chromatography apparatus of the invention includes two parallel side members which can be fixed at a certain distance from one another, and each of which is provided with chamber holding means. The two holding means form between their facing sides a chamber holder, each holding means being articulated at one end thereof to the side members and is adjustably held at the desired angle in arcuate slots provided in the other ends of the side members. In this embodiment, the sandwich chamber lies on the side members and is prevented from sliding downwardly by a stop, such as a chamber holding lug.

In this embodiment, sandwich chambers of any width can be used by simply adjusting the distance between the side members and depending a washing agent trough of the desired length on the end of the chamber holder.

Other features and advantages of the invention will appear from the following description, taken in connection with the drawing, wherein.

In the figures of the drawing, parts having the same function are identified by the same reference numerals.

Figure 1:
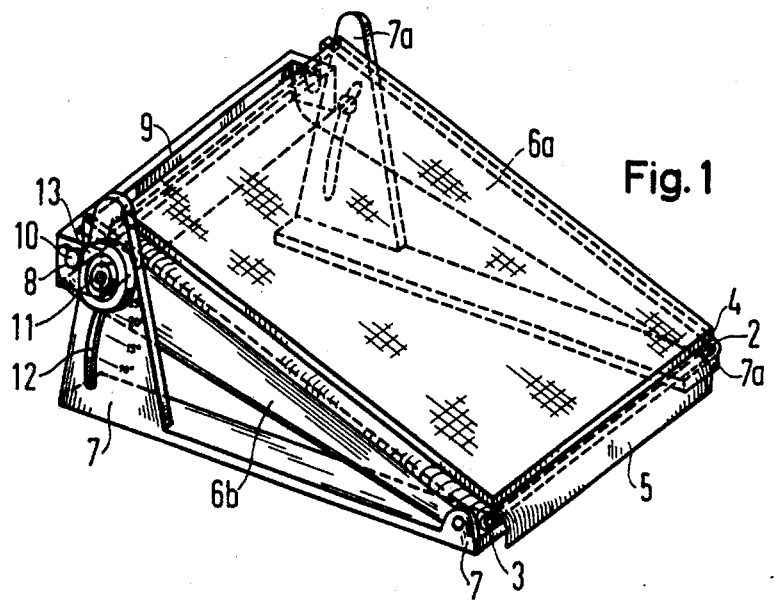
FIG. 1 is a perspective view of an embodiment of the apparatus of the invention showing the side members.
Figure 2:
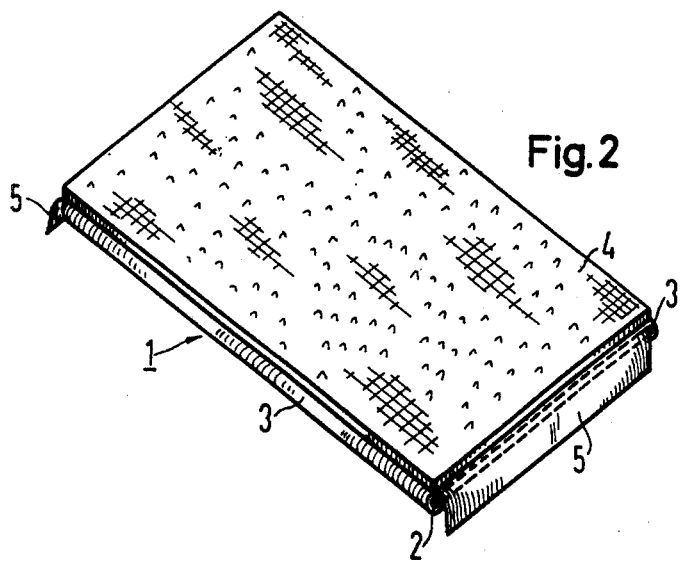
FIG. 2 is a perspective view of a sandwich chamber according to the invention.
Figure 3:
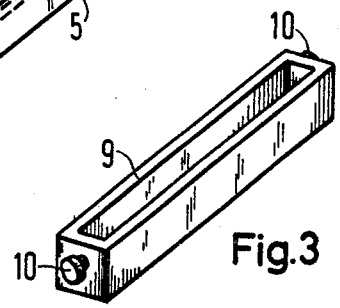
FIG. 3 is a perspective view of an embodiment of the washing agent trough.

Referring now more particularly to the drawings, there is illustrated in FIG. 1 an embodiment of the apparatus of the invention with the sandwich chamber shown in place. (The latter has been shown separately in FIG. 2 for the sake of clarity.) The sandwich chamber 1 is composed of the gel plate 2, two longitudinally slit tubes 3 which are drawn over the longitudinal edges of the gel plate, or cover plate 4. The cover plate 4 lies on the slit tubes 3 and by its own weight seals the chamber on the elastic tube walls. In the ready-to-operate condition, the gel (not shown) is located between the gel plate and the cover plate, and is in communication at the top end of the chamber with the washing agent trough and at the chamber's bottom end with a drain tray or the like, through the medium of strips 5 prepared from an absorbent material. The sandwich chamber rests on the chamber holder 6, which in the illustrated embodiment consists of two chamber holding members 6a and 6b, which are articulately mounted at their lower portions on pivot pins in two side members 7 and 7a. At the other end the chamber holder is provided with hook means 8 in which the washing agent trough 9 is pivotably mounted by means of hanger pins 10. As can be seen from FIG. 3, the hanger pins 10 are located on the sides of the trough so that an imaginary line joining them is located above the center of gravity of the trough. In this manner, when the angle of the chamber holder varies the trough always rotates so that the level of the washing agent remains unchanged in relation to the edges of the trough. Each of the holding members 6a and 6b has near its upper end a threaded stud 11 which is guided in an arcuate slot 12 in each of the lateral members 7 and 7a, and can be fixed in place by a nut 13.

The thin-layer chromatography apparatus of the invention can be made of any desired material and preferably is constructed of plastic, most preferably transparent plastic. The gel plate and the cover plate are constructed of a preferably transparent, solvent-proof and scratch-resistant material. Glass plates can be used very advantageously for this purpose. The tubes can be manufactured, for example, of rubber or plastic. It is important that the tube material be soft and elastic enough to prevent the cover plate from sliding off and for providing an adequate sealing of the sandwich chamber. Ordinary, commercially available tubing made of any suitable rubber or plastic materials is advantageously used for these purposes.

In operation, the thinned gels are applied to the gel plate 2 by means of an appropriate charging device, as for example, the coating apparatus manufactured by Camag of Muttens, Switzerland. Usually the coating thicknesses amount to about 0.5 to 1 mm. After allowing the coated gel plate 2 to stand for about a quarter of an hour exposed to the air, it is kept for a number of days in a steam-saturated drier. Before use, a strip of porous material 5, such as a strip of filter paper, moistened with the washing agent, is applied across the upper margin of the gel coating with about an 1 cm. overlap. Another similar strip 5 is applied against the bottom margin of the gel coating. The cover plate 4 is then laid on. The inclination of the assembled sandwich chamber 1 is adjusted to the desired degree by appropriate manipulation of the threaded studs 11 in the slots 12, and the tightening of nuts 13. After the substance to be chromatographed has been applied, the upper porous strip 5 is suspended in the washing agent contained in the washing agent trough 9. By capillary action, the strip constantly takes up washing agent from the trough from which it runs downwardly through the gel where it is absorbed by the bottom strip 5. Examinations can be carried out during the chromatography in seconds merely by lifting off the cover plate 4, testing with an ultraviolet lamp or Geiger counter, for example, and immediately recovering the gel.

Figure 4:
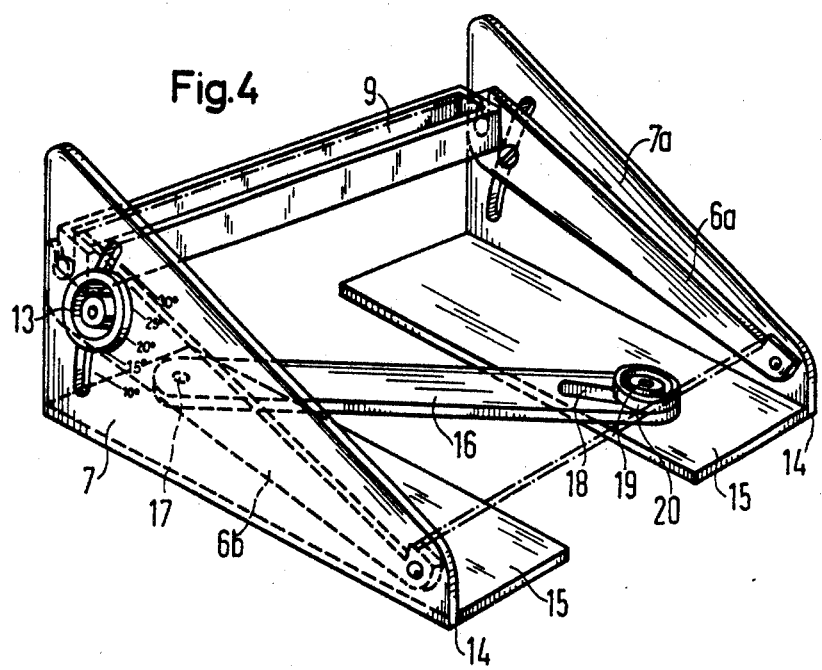
FIG. 4 is a perspective, schematic view of another embodiment of the invented apparatus showing side members having adjustable widths.

Another embodiment of the apparatus of the invention is shown in FIG. 4. In this embodiment the two side members 7 and 7a have a basic triangular shape. At the bottom edge 14, the side members are bent at right angles or have bottom members 15 attached at right angles. The linkage between the two side members is provided at the one end by the trough 9 and at the other end by a diagonal brace 16 which is pibotably fastened to one side member 7 or 7a, by means of a pivot pin 17, for example. The other end of the diagonal brace 16 has a slot 18 in which a threaded stud 19 can be moved, which is set in the other of the side members 7 and 7a. The distance between the side members 7 and 7a can be varied as desired by displacing the stud 19 in slot 18 and pivoting the diagonal brace 16 on pivot pin 17, then tightening the nut 20. Parallelism between the side members 7 and 7a is achieved by inserting a washing agent trough 9 having the desired dimension.

In this embodiment sandwich chambers of any desired width can be used, merely by providing a washing agent trough of corresponding length.

Figure 5:
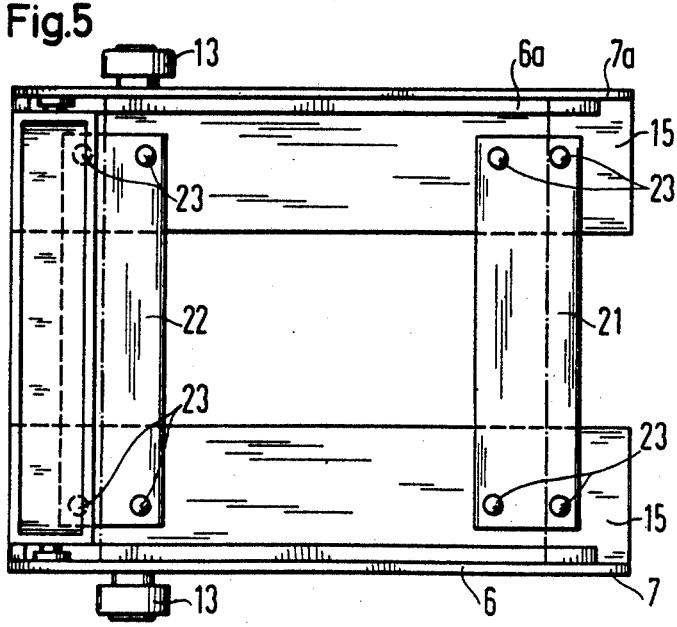
FIG. 5 is a top view of another embodiment of the apparatus of the invention and illustrating side members having adjustable widths.

In accordance with another embodiment of the apparatus of the invention, in which the width is adjustable, as shown in top view in FIG. 5, the side members 7 and 7a are joined together by transverse members 21 and 22 which are removably fastened to the bottom members 15. This fastening is accomplished by means of projections 23 which engage into corresponding recesses. The apparatus can be adapted to the desired sandwich chamber widths by replacing the transverse members and the trough.

The lateral tubes which are drawn over the lateral edges of either the gel or cover plate can either be applied to the gel plate as shown in the drawing, or to the cover plate. In the latter method, the coating of the gel plate is often facilitated.

I claim:

1. A thin layer chromatography apparatus for conducting thin layer gel and ion exchanger chromatography comprising a sandwich chamber consisting of a gel plate, a cover plate and a pair of longitudinally slit tubes drawn over the lateral edges of one of said cover and gel plates; a chamber holder having pivot means mounted at one end thereof for pivotably holding said sandwich chamber at one end thereof; and a washing agent trough mounted on the opposite end of said sandwich chamber, said trough being mounted for rotational movement about an axis located above its center of gravity.

2. A thin layer chromatography apparatus according to claim 1 wherein said chamber holder consists of two holding members mounted at their lower portions for rotation in two side members and wherein said chamber holder is provided at its upper portion with lateral pin means which can be guided and fixed in place in an arcuate slot located in each of said side members.

3. A thin layer chromatography apparatus according to claim 2 wherein said side members have a basically triangular shape.

4. A thin layer chromatography apparatus according to claim 3 wherein said side members are bent at right angles at their lower edges to form bottom members.

5. A thin layer chromatography apparatus according to claim 3 wherein said side members are attached at their lower edges at right angles to bottom members.

6. A thin layer chromatography apparatus according to claim 1 wherein said chamber holder has at its upper free end a notch in which said washing agent trough is suspended by means of pivot pins.

7. A thin layer chromatography apparatus according to claim 3 wherein the distance between said side members is established and maintained by diagonal brace means, which diagonal brace means is rotatably connected to one bottom member and connected to the other bottom member by clamping means in a guiding slot.

8. A thin layer chromatography apparatus according to claim 4 wherein the distance between said side members is established and maintained by diagonal brace means, which diagonal brace means is rotatably connected to one bottom member and connected to the other bottom member by clamping means in a guiding slot.

9. A thin layer chromatography apparatus according to claim 3 wherein the distance between said side members is established and maintained by cross members releasably fastened to said bottom members.

10. A thin layer chromatography apparatus according to claim 4 wherein the distance between said side members is established and maintained by cross members releasably fastened to said bottom members.

11. A thin layer chromatography apparatus according to claim 2 wherein said side members are provided at said arcuate slot with a degree scale for varying the degree of inclination of said sandwich chamber.

12. A thin layer chromatography apparatus according to claim 1 wherein said chamber holder and said trough are constructed of transparent plastic.

13. A thin layer chromatography apparatus according to claim 1 wherein said longitudinally slit tubes are constructed of rubber or plastic.

References Cited

UNITED STATES PATENTS

| | | | |
|---|---|---|---|
| 3,189,541 | 6/1965 | Brenner et al. | 210—198 |
| 3,342,333 | 9/1967 | Geiss et al. | 210—198 X |

JAMES L. DECESARE, Primary Examiner